United States Patent
Goodman et al.

(10) Patent No.: US 10,372,914 B2
(45) Date of Patent: Aug. 6, 2019

(54) VALIDATING FIRMWARE ON A COMPUTING DEVICE

(71) Applicant: LENOVO (Singapore) PTE, LTD., New Tech Park (SG)

(72) Inventors: Steven D. Goodman, Raleigh, NC (US); Mikio Hagiwara, Tokyo (JP); William Laurence Jaeger, Jr., Pittsboro, NC (US); Eitaroh Kasamatsu, Kawasaki (JP); Kohsuke Ohtani, Tokyo (JP); Randall Scott Springfield, Chapel Hill, NC (US); David Burke Stone, Wake Forest, NC (US); Christopher Aaron Whitesock, Clayton, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 194 days.

(21) Appl. No.: 14/749,424

(22) Filed: Jun. 24, 2015

(65) Prior Publication Data
US 2016/0378990 A1 Dec. 29, 2016

(51) Int. Cl.
*G06F 21/57* (2013.01)
*G06F 21/64* (2013.01)
*H04L 29/08* (2006.01)

(52) U.S. Cl.
CPC ............ *G06F 21/572* (2013.01); *G06F 21/64* (2013.01); *G06F 2221/2111* (2013.01); *H04L 67/18* (2013.01); *H04L 67/34* (2013.01)

(58) Field of Classification Search
CPC .. G06F 21/572; G06F 21/645; G06F 21/6218; G06F 21/31; H04L 67/18
See application file for complete search history.

(56) References Cited

U.S. PATENT DOCUMENTS

| | | | |
|---|---|---|---|
| 2013/0124562 A1* | 5/2013 | Christensen | ...... G06F 17/30864 707/770 |
| 2013/0185548 A1* | 7/2013 | Djabarov | ................ G06F 21/57 713/2 |

(Continued)

FOREIGN PATENT DOCUMENTS

KR 20080083512 A * 9/2008

*Primary Examiner* — Khoi V Le
*Assistant Examiner* — Carlton Johnson
(74) *Attorney, Agent, or Firm* — Kunzler Bean & Adamson

(57) ABSTRACT

For validating computing device firmware, systems, apparatus, and methods are disclosed. The apparatus includes a processor, and a memory that stores code executable by the processor, the code including code that acquires a firmware manifest for locally stored firmware, authenticates a digital signature of the firmware manifest, and validates contents of the locally stored firmware using the firmware manifest. The apparatus may also include code that generates a local firmware manifest from the firmware, wherein validating the contents of the firmware includes comparing the local firmware manifest to the firmware manifest. In certain embodiments, the apparatus may indicate, to a user, one of success and failure of the firmware validation. The firmware manifest may be a location-specific firmware manifest corresponding to a geographical location of the apparatus and/or computing device including the locally stored firmware.

20 Claims, 7 Drawing Sheets

(56) References Cited

U.S. PATENT DOCUMENTS

2013/0347058 A1* 12/2013 Smith .................... G06F 21/57
726/1
2014/0033188 A1* 1/2014 Beavers .................. G06F 8/65
717/170

* cited by examiner

VALIDATING FIRMWARE ON A COMPUTING DEVICE

FIELD

The subject matter disclosed herein relates to computing device firmware and more particularly relates to validating firmware on a computing device.

BACKGROUND

Description of the Related Art

In today's security conscious world, customers need a way to validate the software and other firmware (e.g., storage controllers, display controllers, network interface components, etc.) on their systems has not been compromised. This is particularly difficult to do in the case of the system UEFI (Unified Extensible firmware Interface) BIOS (Basic Input/Output System). and other firmware components on the system. Validation of UEFI BIOS and other firmware in today's world relies on digital signature embedded in the firmware image. The signature is checked as part of the installation/update process. Once installed, the system relies on the Flash write protection mechanisms for protection of the firmware.

As a result of requiring implicit trust in the digital signature, some customers are requiring the BIOS/firmware to be produced, released, and signed by trusted entities within their country or geography. This requirement may result in multiple versions of the same product, where the only difference in the products is the signature of the firmware.

BRIEF SUMMARY

An apparatus is disclosed. A method and computer program product also perform the functions of the apparatus. The apparatus includes a processor and a memory that stores code executable by the processor, the code including code that code that acquires a firmware manifest for locally stored firmware, authenticates a digital signature of the firmware manifest, and validates contents of the locally stored firmware using the firmware manifest. In some embodiments, the apparatus also includes code that identifies a geographical location of the apparatus, wherein acquiring the firmware manifest includes downloading a location-specific firmware manifest corresponding to the identified geographical location. In some embodiments, the apparatus includes code that selects the locally stored firmware from a plurality of locally stored firmware residing on a local storage device.

In certain embodiments, validating the contents of the locally stored firmware includes identifying, from the firmware manifest, expected properties of the locally stored firmware. Validating the contents of the locally stored firmware may include determining, from the locally stored firmware, properties of the locally stored firmware corresponding to the identified properties. Validating the contents of the locally stored firmware may include comparing the determined properties to the expected properties. In some embodiments, the determined properties may include one or more of a location, a type, a size, and checking data.

In certain embodiments, the contents of the locally stored firmware include a plurality of regions, each region having one or more of a location, a type, a size, and checking data. In some embodiments, the apparatus includes code that generates an output file including details of the comparison. In certain embodiments, the locally stored firmware includes a basic input/output system (BIOS) firmware.

The method includes accessing a firmware manifest for a firmware image, the firmware manifest including a digital signature, verifying the digital signature, and validating contents of the firmware image based on the firmware manifest. In some embodiments, the method also includes generating a local firmware manifest from the firmware and validating the contents of the firmware may include comparing the local firmware manifest to the firmware manifest. In some embodiments, the method includes indicating, to a user, one of success and failure of the firmware validation based on the comparison.

In certain embodiments, generating a local firmware manifest from the firmware image includes identifying a plurality of logical sections of the firmware and determining a characteristic for each logical section, the characteristic selected from the group consisting of a type of data stored in the logical section, a size of the logical section, and checking data for the logical section. In certain embodiments, comparing the local firmware manifest to the firmware manifest may include comparing, for each of the plurality of logical sections, a local firmware manifest characteristic to a firmware manifest characteristic. In some embodiments, the method includes outputting a return code, in response to failure of the firmware validation, the return code indicating at least one reason for failure of the firmware validation.

In some embodiments, the method includes identifying a geographical location of the apparatus, wherein accessing the firmware manifest comprises downloading a location-specific firmware manifest corresponding to the identified geographical location. In some embodiments, the method includes downloading the firmware manifest from one of an author of the firmware image and a trusted third party. In some embodiments, the method includes prompting a user to configure a computing device using the validated firmware.

In certain embodiments, the firmware comprises a plurality of independent sections of code and wherein the firmware manifest includes a sub-firmware manifest for each independent section of code in the firmware. In certain embodiments, validating contents of the firmware using the firmware manifest comprises comparing, prior to installation of the firmware, portions of the firmware to expected values indicated by the firmware manifest. In certain embodiments, accessing the firmware manifest comprises downloading a location-specific firmware package, the firmware package containing both the firmware image and the firmware manifest.

The computer program product includes a computer readable storage medium that stores code executable by a processor, the executable code comprising code to perform: acquiring a firmware manifest for locally stored firmware, the locally stored firmware including a digital signature, authenticating the digital signature, and validating contents of the locally stored firmware using the firmware manifest. In some embodiments, the computer program product may include creating a locally generated firmware manifest from the locally stored firmware, wherein validating contents of the locally stored firmware using the firmware manifest comprises comparing the locally generated firmware manifest to the firmware manifest. In some embodiments, the computer program product may include prompting a user to install the locally stored firmware in response to successfully validating the locally stored firmware, wherein validating the locally stored firmware comprises examining the locally stored firmware in an uninstalled state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
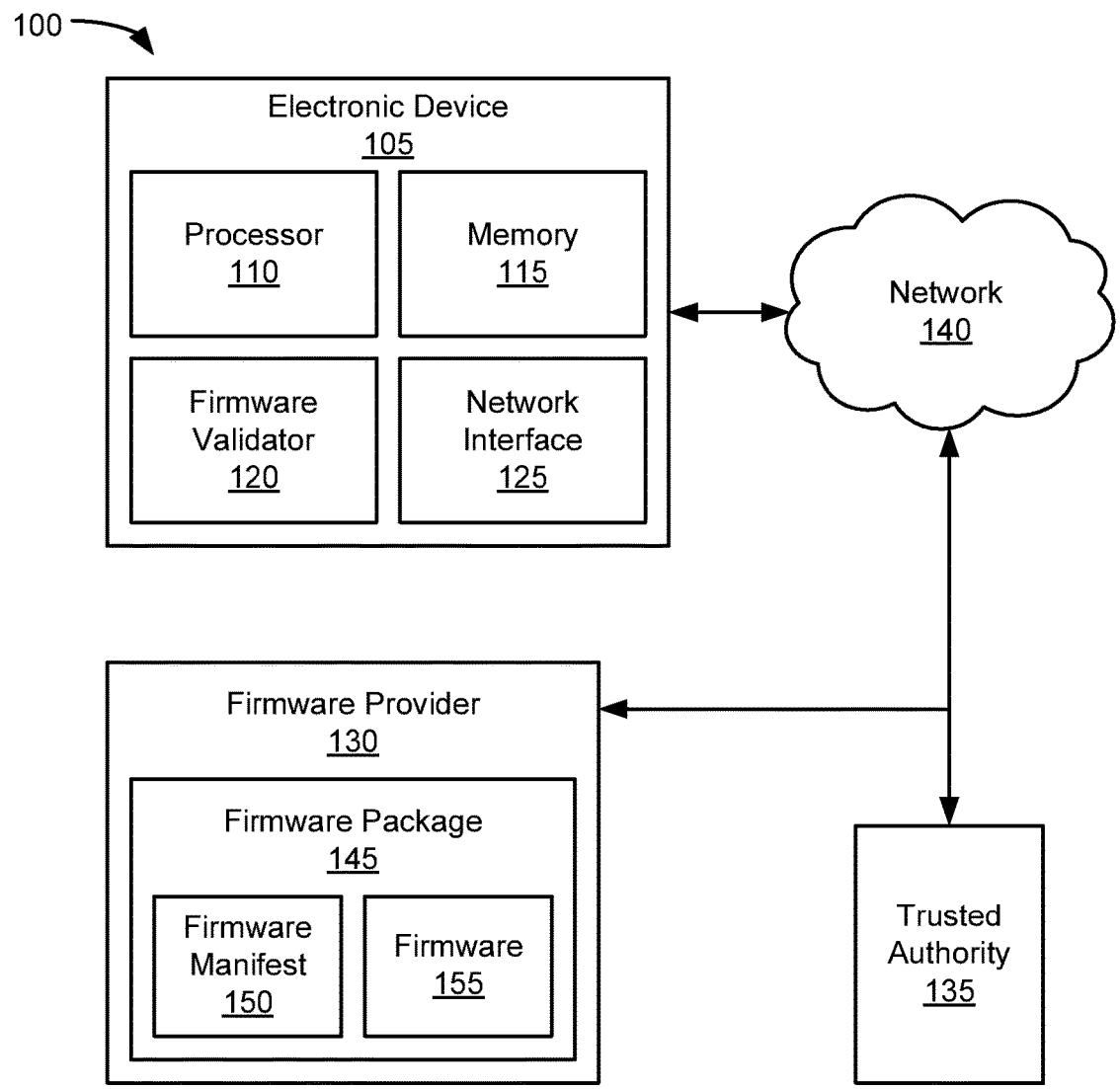
FIG. 1 is a schematic block diagram illustrating one embodiment of a system for validating firmware of a computing device.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the described embodiments describe systems, apparatus, method, processes, and computer program products that load a firmware manifest for a firmware image, the firmware manifest including a digital signature, verifying the digital signature, and validating contents of the firmware using the firmware manifest. Conventional validation of UEFI (Unified Extensible firmware Interface) BIOS (Basic Input/Output System) and other firmware in today's world relies on digital signature embedded in the firmware image. The digital signature is checked as part of the installation/update process. Once the firmware is installed, a computing device relies on the write protection mechanisms of the rewriteable memory storing the firmware for protection of the firmware.

Some firmware validation proposals use a firmware manifest that is intended to be used to verify the output log after boot. However, these proposals are limited to certifying the firmware (e.g., a UEFI BIOS) after it has been installed (e.g., programmed into an electrically erasable programmable read-only memory (EEPROM)) and the system has been booted. An additional limitations to conventional approached is there is no checking of unused space in the flash.

Since there is usually no PKI (Public Key Infrastructure) to validate the signature of the image, the user is required to implicitly trust the key embedded in the firmware. As a result of requiring implicit trust in the signing key, some customers are requiring the BIOS/firmware to be produced, released, and signed by trusted entities within their country or geography. This requirement may result in multiple versions of the same product, where the only difference in the products is the signature of the firmware.

The described embodiments allow a user to validate firmware without requiring the firmware (e.g., a BIOS image) itself to be signed by a country or geography specific key. Rather, a signed firmware manifest is used to validate the firmware. The firmware (e.g., a UEFI BIOS) to be validated may be currently installed on a computing device and/or may be in an uninstalled state (e.g., about to be installed on the system). A firmware manifest is created, for example as part of a given firmware release.

The firmware manifest contains information that allows the firmware to be checked once the firmware is released (e.g., identification of code, data, and free space; location, length, hashes of the various spaces, etc.). The firmware manifest is signed by the BIOS originator, or another trusted entity, to prove the authenticity of the data within the firmware manifest. This trusted data is then be used to validate the contents of the installed firmware image (e.g., BIOS firmware programmed into a BIOS EEPROM) or an image that is about to be installed.

Firmware validation via signed firmware manifest can be added to the existing worldwide build and release process with relatively minor impact to the current process. Because it can be added with little impact to the existing process, firmware validation via signed firmware manifest can be retrofitted to existing products where additional assurance required by a customer has not existed before. Additionally, the described firmware validation is flexible, so that each customer or geography can set a different standard for establishing trust independently of any other customer or geography (including the capability for a customer to generate a firmware manifest unique to their installation that includes data areas in the flash ROM (Read-Only Memory)). If desired a PKI may be used to increase the trust level.

FIG. 1 depicts a system 100 for reduced storage of stroke data. The system 100 may include an electronic device 105, itself including a processor 110, a memory 115, a firmware validator 120, and a network interface 125. The electronic device 105 may be any computing device capable of storing firmware, including, but not limited to, a mobile phone, a smart phone, a tablet computer, a laptop computer, a desktop computer, a personal computer, a portable gaming console, a server, a mainframe, a networked storage device, or the like. In some embodiments, the electronic device 105 may be connected to another device, such a firmware provider 130, and/or a trusted authority 135, via a data network 140. The network 140 may be the Internet, a local area network, a wide-area network, a Wi-Fi network, a mobile telephone network, or combinations thereof.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a field programmable gate array (FPGA), or similar programmable controller. In some embodiments, the processor 110 executes instructions stored in the memory 115 to perform the methods and routines described herein. The processor 110 is communicatively coupled to the memory 115, the firmware validator 120, and the handwriting input device 125.

The memory 115, in one embodiment, is a computer readable storage medium. In some embodiments, the memory 115 includes volatile computer storage media. For example, the memory 115 may include a random access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory device, a read-only memory (ROM), a programmable ROM (PROM), a BIOS chip, or any other suitable non-volatile computer storage device. In some embodiments, the memory 115 includes both volatile and non-volatile computer storage media.

In some embodiments, the memory 115 stores data relating to validating firmware on a computing device, for example, the memory 115 may store firmware, firmware manifests, and the like. In some embodiments, the memory 115 also stores program code and related data, such as an operating system or other controller algorithms operating on the electronic device 105.

The firmware validator 120, in one embodiment, is configured to load, by use of a processor, a firmware manifest for a firmware image, verifying a digital signature of the firmware manifest, and validating contents of the firmware using the firmware manifest. The firmware validator 120 may determine characteristics for each logical section of the firmware, wherein validating the firmware includes verifying that the determined characteristics match values stored in the firmware manifest. In some embodiments, the firmware validator 120 may prompt a user to select for validation a particular firmware corresponding to the firmware manifest from among a plurality of firmware. The firmware validator 120 may further create a locally generated manifest from the firmware, wherein validating the firmware includes comparing the locally generated manifest to the firmware manifest.

In one embodiment, the firmware validator 120 may be implemented as a device driver for the electronic device 105, providing an interface between hardware of the electronic device 105 and higher level software. In another embodiment, the firmware validator 120 may be implemented as a controller and/or firmware of the electronic device 105.

The network interface 125, in one embodiment, comprises software and/or hardware connecting the electronic device 105 to the firmware provider 130 and/or the trusted authority 135, either directly or via the network 140. For example, the network interface 125 may include a physical network adapter and one or more protocol stacks for sending queries to and receiving responses and/or data from the firmware provider 130 and/or the trusted authority 135 using computer networking protocols. In one embodiment, the network interface 125 may include a wireless networking interface that connects the electronic device 105 to the firmware provider 130 and/or the trusted authority 135 over radio or other wireless communication mediums. In another embodiment, the network interface 125 may include a wired or fiber optic interface for connecting the electronic device 105 to the firmware provider 130 and/or the trusted authority 135. In some embodiments, the network interface 125 is configured to establish secure connections with the firmware provider 130 and/or the trusted authority 135.

The firmware provider 130, in one embodiment, comprises a server configured to store and deliver the firmware manifest 150 and a firmware image 155. In certain embodiments, the firmware provider 130 hosts the firmware package 145 that includes both the firmware manifest 150 and the firmware image 155. In one embodiment, the firmware manifest 150 includes a digital signature certifying the integrity of the firmware manifest 150. In another embodiment, the firmware package 145 may include the digital signature, wherein the digital signature certifies the integrity of the firmware package 145, and thus the integrity of the firmware manifest 150.

In some embodiments, the firmware provider 130 is the originator of the firmware image 155. As used herein, the originator of the firmware image 155 refers to the author that develops the firmware image 155. In certain embodiments, the firmware originator also generates the firmware manifest 150. In other embodiments, the firmware manifest 150 may be generated by another entity.

The trusted authority 135, in one embodiment, is an entity entrusted to authenticate (e.g., verify) a digital signature. For example, the trusted authority 135 may include a certificate authority, a public key infrastructure, or other trusted third-party. In certain embodiments, the trusted authority 135 is distinct from the firmware provider 130. In other embodiments, the trusted authority 135 and the firmware provider 130 may be the same entity.

The electronic device 105 may receive a firmware image, for example from the firmware provider 130. The firmware validator 120 may obtain a firmware manifest corresponding to the firmware image. In some embodiments, the firmware manifest is obtained from the firmware provider 130, in other embodiments, the firmware manifest is obtained from an author of the firmware image or from a trusted third-party. In some embodiments, the firmware manifest is an XML file containing XML entries that describe the expected regions of the firmware image and expected properties of said regions.

The firmware validator 120 may authenticate a digital signature included in the firmware manifest. In some embodiments, the firmware validator 120 contacts the trusted authority 135 (e.g., via the network interface 125 and the network 140) to authenticate the digital signature. The firmware manifest to be signed by trusted third-party who has evaluated the firmware to an agreed-upon standard. The digital signature ensures the integrity of the firmware manifest. In some embodiments, the firmware manifest itself is digitally signed via the digital signature. In other embodiments, a firmware package including the firmware manifest may be digitally signed via the digital signature. In some embodiments, the digital signature may follow an industry standard, for example the signature may be an SHA (secure hash algorithm) 256, RSA 2048 bit signature.

The firmware validator 120 may parse the firmware image to find firmware volumes, firmware files, and areas not included in firmware volumes. In some embodiments data is stored in these areas not included in firmware volumes. In other embodiments, the areas not included in firmware volumes may be empty. A hash maybe computed for each region found and compared to a predetermined hash for that region found in the firmware manifest. In some embodiments, the firmware manifest is generated when the firmware is compiled. In other embodiments, the firmware manifest may be generated after the firmware compiled.

Where the firmware is a UEFI BIOS image, the firmware code may be arranged as firmware volumes with headers that contain volume information. The firmware validator 120 may validate the contents of the firmware using the volume information in the headers. In some embodiments the BIOS may include configuration data for user variable data. However, the firmware validator 120 may not attempt to validate the contents of data regions of the firmware.

In some embodiments, the firmware may be a BIOS including a boot block region. In such circumstances, the firmware manifest may comprise two manifests: one manifest for the boot block and another manifest for the remainder of the BIOS image. The firmware validator 120 may parse the firmware image to identify whether a boot block is present and, if present, parse the firmware manifest to identify a manifest for the boot block.

In some embodiments, the firmware manifest includes an indicator of the type of data that is contained in a given region, such as a cold volume or file, a data volume or file, unused space not in a firmware volume, and/or data space not contained within a firmware volume. As indicated above, where the region stores data (e.g., where the region is a data volume/file or data space not contained within a firmware volume), checking data used to validate the contents of the region may be ignored. Alternatively, a user specify that check of contents of the data regions be performed using the checking data. In some embodiments, the checking data is SHA 256 hash.

Figure 2:
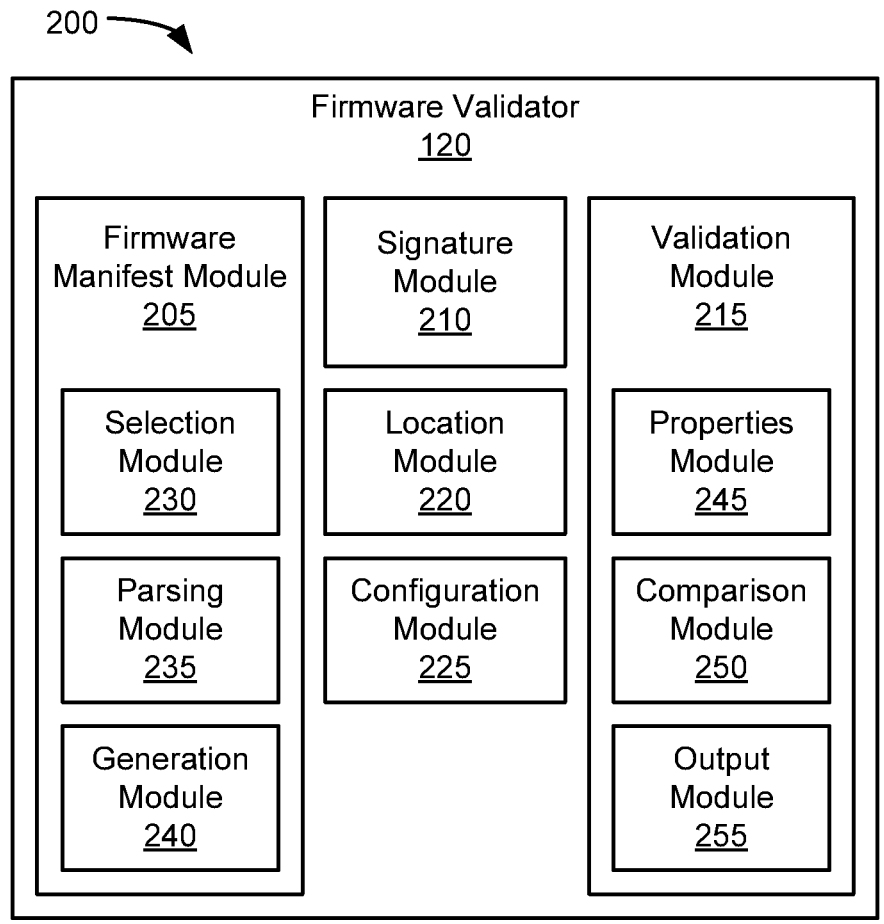
FIG. 2 is a schematic block diagram illustrating one embodiment of an apparatus for validating firmware of a computing device.

FIG. 2 depicts a firmware validation apparatus 200 for reduced storage of stroke data. The firmware validation apparatus 200 may include a firmware validator 120 substantially as described above with reference to FIG. 1. As depicted, the firmware validator 120 includes a firmware manifest module 205, a signature module 210, and a validation module 215. In some embodiments, the firmware validation apparatus 200 may also include one or more of: a location module 220, a configuration module 225, a selection module 230, a generation module 240, a parsing module 235, a properties module 245, a comparison module 250, and an output module 255. The modules 205-255 may be connectively coupled to one another. In certain embodiments, each of the modules 205-255 may be implemented in a hardware circuit, as described above. In other embodiments, one or more of the modules 205-255 may be implemented as firmware and/or software, such as program code embedded on computer readable media, as described above.

The firmware manifest module 205, in one embodiment, is configured to acquire a firmware manifest for a firmware image, such as locally stored firmware in the memory 110. In some embodiments, the firmware manifest module 205 may acquire the firmware manifest by downloading the firmware manifest a remote location, such as from the firmware provider 130, an author of the firmware image, or a trusted third-party. In further embodiments, the firmware manifest module 205 may download a firmware package that includes both the firmware manifest and the firmware image.

The firmware manifest is a file that includes information usable for validating the firmware. For example, the firmware manifest may be an XML file. In some embodiments, the firmware manifest includes a plurality of entries that describe logical divisions within the firmware. For example, the firmware may be a UEFI BIOS firmware containing a plurality of file volumes (FVs) which store the firmware files and other firmware data. The firmware may include headers for each FV, allowing the FVs to be located in the firmware image. The information in the headers may also include information indicating a file volume type (e.g., file system FV or data FV) and size. Accordingly, the firmware manifest may include entries that describe each FV in the firmware image, including location, size, type, and checking data for detecting whether the contents of been changed.

In some embodiments, the firmware manifest also includes information for areas in the firmware image that are not included in a file volume. The gaps between file volumes may be reserved for future use and/or used to store additional data. Accordingly, the firmware manifest may include entries describing the locations, sizes, and checking data for each gap in the firmware image. Additionally, the firmware manifest includes a digital signature created by a trusted party, such as the trusted authority 135 and/or a firmware originator. The digital signature proves the integrity of the data within the firmware manifest. In some embodiments, the digital signature may be specific to a certain country or geography. For example, the digital signature may belong to an entity trusted by a government, agency, or other entity within a country.

In certain embodiments, the firmware manifest includes one or more sub-manifests. For example, a BIOS firmware image may be separated into logical portions they can be updated independently. A smaller portion of code known as a "boot block" may be configured to repair corruption in the remainder of the firmware image, either a remainder of the entire image or a remaining portion of the independently updateable section. Where the firmware image is separated into independent sections, the firmware manifest may include a sub-firmware manifest for each independent section of code in the firmware. For example, a firmware manifest for the BIOS image may include one sub-manifest that describes the boot block and another sub-manifest that describes the remainder. As another example, the firmware may comprise a plurality of independent sections, wherein the firmware manifest includes a sub manifest for each independent section of the firmware image.

In some embodiments, the firmware manifest module 205 may receive a user selection of a particular firmware image, identify expected properties of the firmware from the firmware manifest, and/or generate a firmware manifest from a firmware image. In further embodiments, the firmware manifest module 205 may include one or more submodules, such as the selection module 230, the parsing module 235, and/or the generation module 240, for performing these functions.

The selection module 230, in one embodiment, is configured to receive, from a user, a selection of a locally stored firmware image from a plurality of locally stored firmware images residing on a local storage device (e.g., memory 115). Some embodiments, a local storage device may include an installed firmware image and one or more uninstalled firmware images, wherein the selection module 230 receives a selection of a firmware image to be validated. In one embodiment, the selection module 230 receives an input parameter selecting a particular firmware. In another embodiment, the selection module 230 may provide a user interface, wherein the user may browse file system of the local sort storage device to select the firmware to be validated. In certain embodiments, the firmware validation apparatus 200 may, as a default option, validate a currently installed firmware in the absence of the user selection.

In some embodiments, the selection module 230 may also receive, from the user, a selection of a firmware manifest to be used in validating the firmware. For example, the user may input the name of the XML file containing the firmware manifest. In a further embodiment, the selection module 230 may receive, from the user, a selection of a firmware package, the firmware package including a firmware to be validated and a firmware manifest for use in validating the included firmware.

The parsing module 235, in one embodiment, is configured to identify, from the firmware manifest, expected properties of the firmware. In a further embodiment, the parsing module 235 may also be configured to identify, from the firmware manifest, a plurality of logical sections (e.g., regions) of the firmware and expected characteristics for each logical section. The expected characteristics of a logical section include one or more of: a type of data stored in the logical section, a size of the logical section, and a checksum for contents of logical section.

The plurality of logical sections of the firmware may include one or more of: file volumes, files, parameter blocks, boot blocks, post-portions, code regions, configuration data regions, user variable data regions, other data regions, and empty regions (e.g., gaps in the addressable memory between others of the logical sections). For example, in one embodiment the firmware may contain firmware file volumes, firmware files within a file volume, unused space not in a firmware volume, and data space not included within a firmware volume.

The generation module 240, in one embodiment, is configured to create a firmware manifest from a firmware image. The locally generated manifest may be stored in the memory 115. The generation module 240 may communicate the locally generated firmware manifest to the validation module 215, wherein the validation module 215 validates firmware image by comparing the locally generated manifest to an authenticated firmware manifest.

In some embodiments, the generation module 240 identifies a plurality of logical sections of the firmware image. The generation module 240 may then determine one or more characteristics for each identified logical section. In certain embodiments, one or more characteristics determined by the generation module 240 include a location of the logical section within the firmware image, a type of content stored in the logical section, a size of the logical section, and/or checking data (e.g., a hash value or checksum) for verifying the contents of the logical section.

Creating the firmware manifest may include the generation module 240 populating a firmware manifest template with identifiers of the plurality of logical sections and the determined characteristics of the logical sections. In some embodiments, the generation module 240 may be configured to sign the locally generated manifest. For example generation module 240 may prompt the signature module 210 apply a digital signature, digital certificate, or the like.

In certain embodiments, the generation module 240 may identify a plurality of independent sections within the firmware image and create a sub manifest for each independent section. In a further embodiment, the firmware image may include a boot block and a post portion, wherein the generation module 240 creates a separate manifest for the boot block and for the post portion. In such circumstances, the generation module 240 may package block manifest and the post portion manifest into a single firmware manifest.

The signature module 210, in one embodiment, is configured to authenticate a digital signature of the firmware manifest. The firmware manifest includes digital signature of a trusted authority, for example trusted authority 135. The signature module 210 may authenticate the digital signature by contacting the trusted authority 135. In other embodiments, the signature module 210 may authenticate the digital signature by contacting another trusted party, such as a certificate authority or other third-party validation authority.

In one embodiment, the digital signature uses a shared secret known by the firmware validation apparatus 200, wherein the signature module 210 authenticates the digital signature using the shared secret. In another embodiment, the digital signature may be created using a public-private key pair, wherein the signature module 210 authenticates the digital signature using the public key of the pair.

In certain embodiments, the signature module 210 may be further configured to digitally sign a locally generated firmware manifest, such as one created the generation module 240. The signature module 210 may sign the locally generated firmware manifest using, for example, a private key of a public-private key pair issued to the firmware validation apparatus 200, a digital certificate issued to the firmware validation apparatus 200, or the like.

The validation module 215, in one embodiment, is configured to validate contents of the firmware image based on the firmware manifest. For example, the validation module 215 may certify the contents of locally stored firmware have not been changed since the creation of the firmware manifest. As another example, the validation module 215 may certify that all expected contents of the firmware image are present. In some embodiments, the contents of the firmware image include a plurality of regions storing firmware code or data. Each region may be associated with certain characteristics, including a location, a type, a size, and/or checking data. The validation module 215 verifies that each region is found at the proper location, is of the expected type, is the expected size, and/or is unaltered (based on the checking data).

In some embodiments, the validation module 215 ignores content of data regions of the firmware image. For example, a BIOS firmware image may include regions of configuration data and/or user variable data, wherein these data regions include unpredictable contents after the firmware image is installed. Accordingly, the validation module 215 may check a location, type, and size of these data regions while ignoring their contents (e.g., ignoring checking data associated with these regions).

In some embodiments, the validation module 215 validates the firmware image by determining properties of the firmware image and comparing these properties to expected values contained in the firmware manifest. In other embodiments, the validation module 215 validates the firmware image by comparing a locally generated manifest to the downloaded firmware manifest. The validation module 215 may further output the outcome of the firmware validation. For example, the firmware image may be successfully validated in response to the locally generated manifest matching the downloaded firmware manifest. Otherwise, the firmware validation may fail. In certain embodiments, the validation module 215 may include one or more sub-modules, such as the properties module 245, the comparison module 250, and/or the output module 255, for performing the above functions.

The properties module 245, in one embodiment, is configured to determine, from the firmware, properties of the firmware. The determined properties may be used to validate the firmware. In a further embodiment, the properties module 245 identify a plurality of logical sections (e.g., a plurality of regions) of the firmware. In some embodiments, the properties may include a region location, a region type, a region size, and checking data for verifying the integrity of contents of the region. Thus, the properties module 245 may be configured to identify a region location, identify a region type, calculate a region size, and generate checking data for contents of a region.

In certain embodiments, the properties module 245 may provide the determined properties to the comparison module 250, wherein the comparison module 250 compares the determined properties to expected values included in the trusted data of the firmware manifest. The properties module 245 may determine properties of a firmware, for example a locally stored firmware, selected by the selection module 230. In certain embodiments, the properties module 245 determines the properties of the firmware prior to installation of firmware.

In some embodiments, properties module 245 includes a hash function for creating a hash value (e.g., checking data) for each region found. The created hash values are then compared (e.g., by the comparison module 250) to predetermined hash values in the firmware manifest corresponding to each found region. In other embodiments, the properties module 245 includes a checksum function for creating the checking data for each region found, wherein the comparison module compares the generated checksums to predetermined checksums found in the firmware manifest.

The comparison module 250, in one embodiment, is configured to compare a locally generated manifest to an authenticated (e.g., trusted) manifest, the authenticated manifest including a digital signature from a trust authority authenticated by the signature module 210. Both the locally generated manifest in the authenticated manifest may include identifiers and one or more characteristics for each of a plurality of logical sections of the firmware. The comparison module 250, in one embodiment, compares, for each of the plurality of logical sections, a characteristic in the local manifest to a corresponding characteristic in the authenticated manifest. In a further embodiment, the comparison module 250 may compare identities and locations of each of the plurality of logical sections between the locally generated manifest and the authenticated manifest.

In some embodiments, the comparison module 250, compares determined properties of the firmware (e.g., determined by the properties module 245) to expected values indicated by the firmware manifest (e.g., identified by the parsing module 235). In some embodiments, the comparison module 250 compares the determined and expected properties for each of a plurality of logical sections (e.g., regions) of the firmware. For example, the comparison module 250 may compare one or more of: a location of a region of the firmware, a region type (e.g., a code region, an empty region, or a data region), a region size, and checking data (e.g., checksum data) for validating contents of the region. In some embodiments, the comparison module 250 indicates to the output module 255 whether the properties of the firmware match the expected values, wherein the output module 255 returns a code indicating the success/failure the comparison.

In certain embodiments, the comparison module 250 compares properties of the firmware to expected values indicated by the firmware manifest prior to installation of the firmware. For example, the firmware may be validated by the firmware validation apparatus 200 while in an un-installed state (e.g., prior to installation on the electronic device 105). In certain embodiments, the comparison module 250 ignores certain properties of data regions within the firmware. For example, contents of the data regions (e.g., data volumes, data files, or data space not contained in a firmware volume) may be expected to change and so comparing a hash value for checksum the contents of data region may not provide useful information.

The output module 255, in one embodiment, is configured to indicate, to a user, one of success and failure of the firmware validation. The upper module 255 may indicate the success or failure of the former validation the audible notification, haptic notification, text notification, or other visual notification. For example, the output module 255 may cause a user interface may display a message to the user indicating whether the firmware was successfully validated. As another example, the output module 255 may display a pop-up window indicating the outcome (e.g., success or failure) of the firmware validation.

In some embodiments, the output module 255 may output at least one return code in response to failure of the firmware validation. The return code may indicate the reason for failure of the firmware validation. In certain embodiments, the output module 255 may also output a return code in response to success of the firmware validation (e.g., a return code indicating successful validation). In one embodiment, the return code is a numerical value serving as a key value of a return code table, wherein an entry of the return code table corresponding to the key value indicates either success or a reason for failure.

Examples of reasons for failure include, but are not limited to, the checked firmware not matching the former manifest, detecting an invalid argument, failed memory allocation, being unable to open a specified file (e.g., firmware or firmware manifest), being unable to load a driver for reading a memory storing firmware (e.g., a BIOS flash chip), encountering invalid data in an input file (e.g., firmware or firmware manifest), a hash function failure (e.g., used to detect modification/corruption of contents of the firmware), being unable to identify a BIOS version, or encountering a processing error.

In some embodiments, the output module 255 may create a file, such as a log, containing detailed results of the validation. The file may further contain one or more return codes for each portion of the firmware analyzed. For example, a log may identify a plurality of regions of the firmware and may include a return code indicating success or failure (including a type of failure) for each of the plurality of regions. As another example, an output file may include, for each portion of the firmware, an expected value (e.g., name, location, size, type, or checksum) based on the firmware manifest, and an actual value determined from the firmware. In further embodiments, the output module 255 may create an output file including detailed error and debug information.

The location module 220, in one embodiment, is configured to identify a geographical location of the firmware validation apparatus 200. The location module 220 may then provide this information to the firmware manifest module 205, wherein the firmware manifest module 205 acquires (e.g., downloads) a location-specific firmware manifest corresponding to the identified geographical location. In certain embodiments, the firmware manifest module 205 may download a location specific firmware package based on the identified geographic location, wherein the firmware package contains both a location specific firmware manifest and corresponding firmware.

The location-specific firmware manifest may be a firmware manifest generated specifically for that geographical location and signed (e.g., using a digital signature or digital certificate) by an authority specific to the geographic location. For example, each nation or country may generate and digitally sign a firmware manifest specific to that country. In this way, governments and other entities of a specific country have a mechanism for validating firmware using a firmware manifest produced and signed by trusted authorities within a country.

In some embodiments, a government and/or entity within a country indicated by the geographic location may indicate that they trust the judgment of a trusted authority within another geographic location (e.g., another country) due to similar requirements between the two locations, treaties, or the reasons. In such circumstances, the firmware manifest module 205 may download the firmware manifest specific to another geographic location, but indicated as compatible with the geographic location determined by the location module 220.

The location module 220, in one embodiment, may prompt a user to enter a geographical location. In other embodiments, the location module 220 may access a location determination device, such as a satellite navigation system receiver. In certain embodiments, the location module 220 may determine the geographic location of the firmware validation apparatus 200 based on a network address, such as an Internet Protocol (IP) address, assigned to the firmware validation apparatus 200.

The configuration module 225, in one embodiment, is configured to install the firmware in response to successfully validating the firmware. For example, the electronic device 105 may be configured using the successfully validated firmware. In some embodiments, the configuration module 225 prompts a user to install the firmware (e.g., to configure the electronic device 105 using the successfully validated firmware). In further embodiments, the configuration module 225 may warn a user not to install the firmware if the firmware is not successfully validated.

Figure 3A:
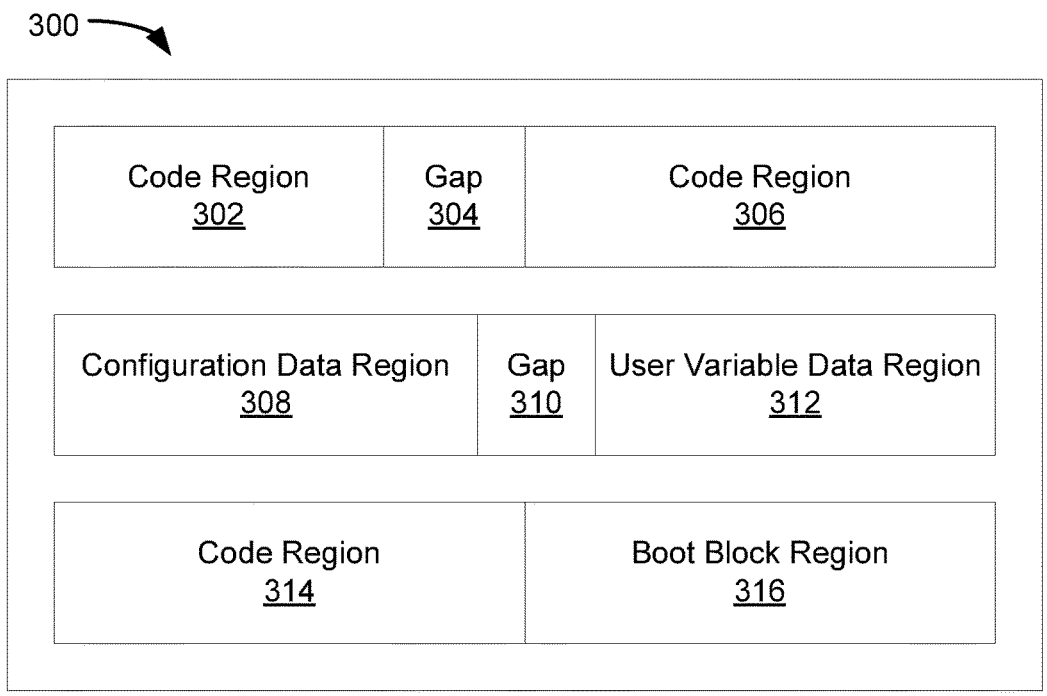
FIG. 3A is a schematic block diagram illustrating one embodiment of a firmware image for a computing device.

FIG. 3A is a block diagram depicting an embodiment of a firmware image 300 for a computing device. The firmware image 300 is depicted conceptually and contains a plurality of logical portions, including a first code region 302, a first gap region 304, a second code region 306, a configuration data region 308, a second gap 310, a user variable data region 312, a third code region 314, and a boot block region 316. In certain embodiments, regions 302-314 are referred to as a "post portion" of the firmware image 300, and separate firmware manifests (or sub-manifests) may be created for each of the boot block region 316 and the post portion region (e.g., regions 302-314). While the firmware image 300 is depicted as having three code regions, two gaps, and two data regions, in other embodiments the firmware image 300 may have more or less code regions, gaps, and/or data regions.

When validating the firmware image 300, the validation module 215 examine each of the regions 302-316 and identify actual characteristics (e.g., locations, sizes, content types, and/or checking data) for each of the regions 302-316. The validation module 215 may further compare the actual characteristics to expected characteristics included in a firmware manifest. If the actual characteristics match the expected characteristics for a particular region, then that region is successfully validated. In one embodiment, the entire firmware image 300 is successfully validated in response to all regions 302-316 being successfully validated. In another embodiment, the entire firmware image 300 fails the validation in response to any of the regions 302-316 failing the validation.

Figure 3B:
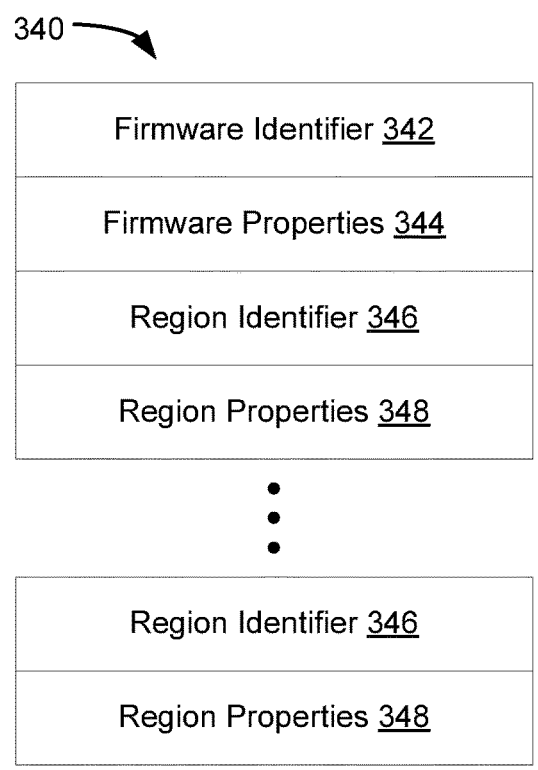
FIG. 3B is a schematic block diagram illustrating one embodiment of a firmware manifest usable for validating firmware the computing device.

FIG. 3B is a block diagram illustrating one embodiment of a firmware manifest 340 usable for validating firmware the computing device. In some embodiments, the firmware manifest 340 may be downloaded by the firmware manifest module 205. In other embodiments, the firmware manifest 340 may be created by the generation module 240. The firmware manifest 340 includes a plurality of entries 342-348. In one embodiment, the firmware manifest 340 includes a firmware identifier 342 used to match the firmware manifest 340 with a firmware image to be validated using the firmware manifest 340. In some embodiments, the firmware identifier 342 may be a version number, an image name, or other identifier. In certain embodiments, the firmware manifest 340 also includes a firmware properties field 344. The firmware properties field 344 may include information relating to the overall size of the firmware image and a number of logical sections (e.g., regions or file volumes) in the firmware image.

The firmware manifest 340 may also include a plurality of region identifiers 346 and a region properties field 348 associated with each region identifier 346. The region identifiers 346 may be used to identify a region of the firmware image corresponding to the region properties field 348 associated with the region identifier 346. In some embodiments, a region identifiers 346 may include a location of a region within the firmware image. The region properties field 348 may include characteristics for the identified region, such as a type of data stored in the region, an expected size of the region, and/or checking data for verifying values stored in the region.

When validating firmware using the firmware manifest 340, a firmware validation device, such as the firmware validation apparatus 200, may access and parse the firmware manifest 340 to identify expected locations and characteristics for each region of the firmware image. Thus, for each region, the firmware validation device may determine an actual location and characteristics and compare the actual values the expected values, wherein the firmware image is successfully validated using the firmware manifest 340 in response to the actual locations in characteristics matching the expected locations and characteristics for all regions of the firmware image.

Figure 3C:
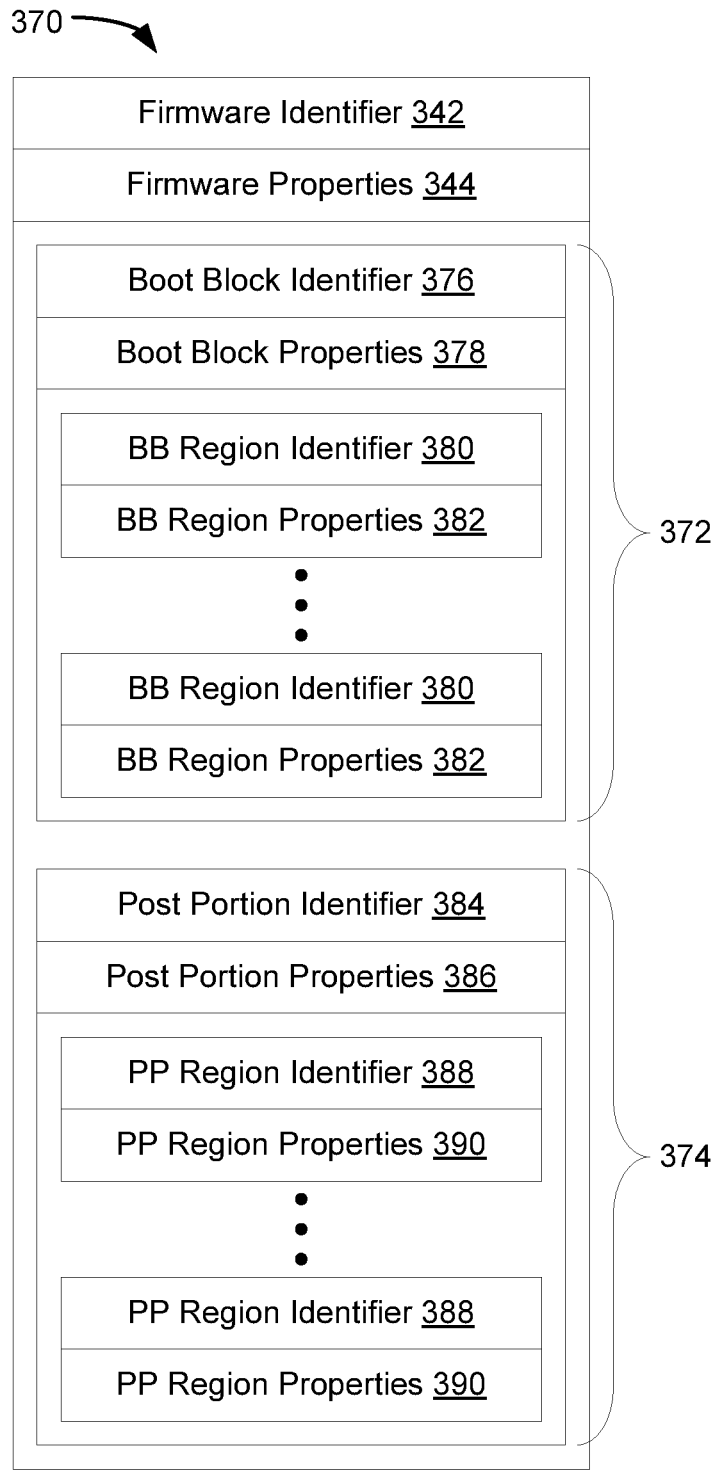
FIG. 3C is a schematic block diagram illustrating another embodiment of a firmware manifest usable for validating firmware the computing device.

FIG. 3C is a block diagram illustrating one embodiment of a firmware manifest 370 useable for validating firmware of a computing device. In some embodiments, the firmware manifest 370 may be downloaded by the firmware manifest module 205. In other embodiments, the firmware manifest 370 may be created by the generation module 240. The firmware manifest 370 includes a firmware identifier 342 and a firmware properties field 344, as described above with reference to FIG. 3B. The firmware manifest 370 includes a boot block sub-manifest 372 comprising a boot block identifier 376, a boot block properties field 378, a plurality of boot block region identifiers 380, and a plurality of boot block region properties 382. The firmware manifest 370 also includes the post portion sub-manifest 374 comprising a post portion identifier 384, a post portion properties field 386, a plurality of host portion region identifiers 388, and a plurality of post portion region properties fields 390.

The boot block identifier 376 identifies a region of the firmware image corresponding to the boot block. In some embodiments, the boot block identifier 376 is a location within the firmware image. The boot block properties field 378 may include information relating to the overall size of the boot block portion of the firmware image and a number of regions in the boot block. The boot block region identifiers 380 may be used to identify a region within the boot block, wherein the associated boot block region properties field 382 described properties of the identified region. In some embodiments, a boot block region identifier 380 may include a location within the boot block. The boot block region properties field 382 may include characteristics for the identified region, such as a type of data stored in the region, an expected size of the region, and/or checking data for verifying values stored in the region.

The post portion identifier 384 identifies a region of the firmware image corresponding to the post portion. In some embodiments, the post portion identifier 384 is a location within the firmware image. The post portion properties field 386 may include information relating to the overall size of the post portion (e.g., non-boot block portion) of the firmware image and a number of regions in the post portion. The post portion region identifiers 388 may be used to identify a region within the post portion, wherein the associated post portion region properties field 390 described properties of the identified region. In some embodiments, a post portion region identifier 388 may include a location of the post portion within the firmware image. The post portion region properties field 390 may include characteristics for the identified region, such as a type of data stored in the region, an expected size of the region, and/or checking data for verifying values stored in the region.

When validating firmware using the firmware manifest 370, a firmware validation device, such as the firmware validation apparatus 200, may access and parse the firmware manifest 370 to identify expected locations and characteristics for each region of the boot block of the firmware image and for each region of the post portion. Thus, for each region, the firmware validation device may determine an actual location and characteristics and compare the actual values the expected values, wherein the firmware image is successfully validated using the firmware manifest 370 in response to the actual values matching the expected values for all regions of the firmware image.

Figure 4A:
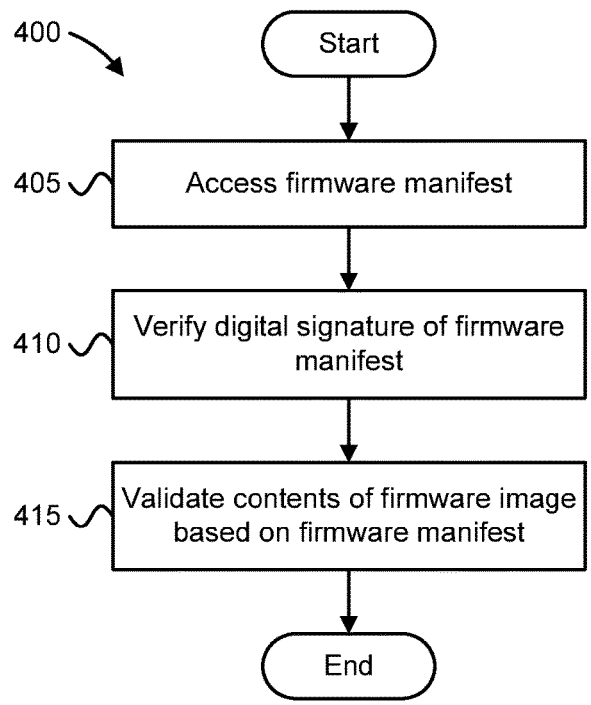
FIG. 4A is a flow chart diagram illustrating one embodiment of a method for validating firmware of a computing device.

FIG. 4A is a flow chart diagram illustrating one embodiment of a method 400 for validating firmware of a computing device. In one embodiment, the method 400 is performed by the electronic device 105. In another embodiment, the method 400 may be performed by the firmware validation apparatus 200. Alternatively, the method 400 may be performed by a computer readable storage medium, such as the memory 115. The computer readable storage medium may store code that is executed on the processor 110 to perform the functions of the method 400.

The method 400 begins and accesses 405 a firmware manifest. In some embodiments, accessing 405 the firmware manifest includes downloading the firmware manifest, for example from the firmware provider 130, an author of the firmware image, and/or the trusted third-party. In other embodiments, accessing 405 the firmware manifest may include selecting a locally stored firmware manifest, for example stored in the memory 115. The firmware manifest contains information used for validating a corresponding firmware image and includes a digital signature.

In some embodiments, the firmware manifest indicates expected logical divisions within the firmware image and their corresponding properties. For example, the former image to be expected to include a plurality of independent sections, wherein the firmware manifest includes a sub-manifest for each independent section of the firmware image.

The method 400 next verifies 410 the digital signature of the firmware manifest. In some embodiments, verifying 410 the digital signature includes contacting a trusted authority, such as the trusted authority 135. In other embodiments, verifying 410 the digital signature may include using a public key of the signatory to authenticate the digital signature.

The method 400 validates 415 contents of the firmware image based on the firmware manifest. The method 400 ends. In some embodiments, validating 415 contents of the firmware image based on the firmware manifest include comparing actual logical divisions within the firmware image and their corresponding properties to the expected values included in the firmware manifest. In other embodiments, validating 415 contents of firmware image based on the firmware manifest may include generating a local manifest from the firmware image and comparing the local manifest to the accessed firmware manifest. The comparisons may occur prior to installation of the firmware image. In one embodiment, validating 415 contents of the firmware image includes indicating one of success and failure of the validation.

Figure 4B:
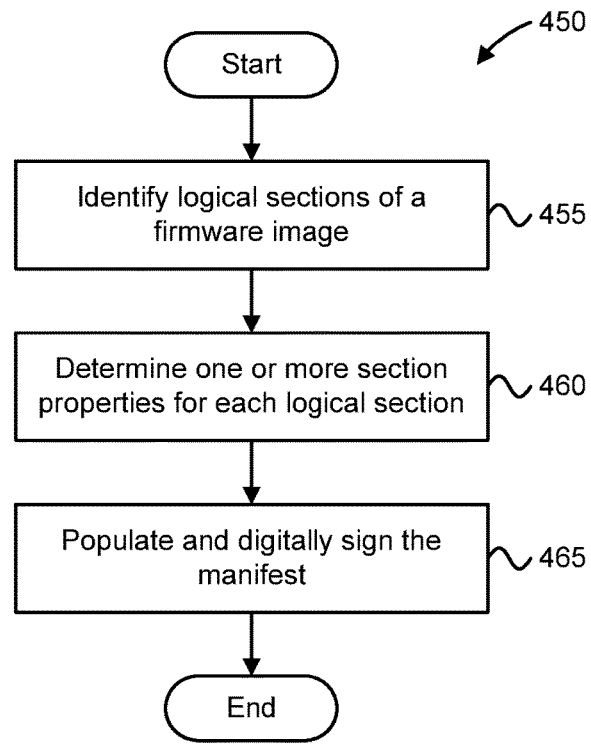
FIG. 4B is a flow chart diagram illustrating one embodiment of a method for creating a firmware manifest usable to validate firmware of a computing device.

FIG. 4B is a flow chart diagram illustrating one embodiment of a method 450 for creating a firmware manifest usable to validate firmware of a computing device. In one embodiment, the method 450 is performed by the electronic device 105. In another embodiment, the method 450 may be performed by the firmware validation apparatus 200. Alternatively, the method 450 may be performed by a computer readable storage medium, such as the memory 115. The computer readable storage medium may store code that is executed on the processor 110 to perform the functions of the method 450.

The method 450 begins and identifies 455 logical sections of a firmware image. For example, logical sections within a BIOS firmware image may be identified 455. In some embodiments firmware image may include a plurality of regions. In a further embodiment, the firmware image may include a boot block used for firmware recovery, and a post portion.

The method 450 determines 460 one or more properties for each logical section. For example, the properties of each logical section may include a location within the firmware image, a content type, and a size. Each logical section may also be associated with checking data used to verify the contents of the logical section.

The method 450 next populates and digitally signs 465 the manifest. The method 450 ends. In some embodiments, populating 465 the manifest includes creating an XML file that includes an identifier of each logical section and the determined properties of each logical section. In certain embodiments, digitally signing 465 the manifest includes applying the digital certificate issued to the electronic device 105, the firmware validation apparatus 200, a user performing the method 450, or the like. In other embodiments, digitally signing 465 the manifest includes creating a digital signature using a private key issued to the electronic device 105, the firmware validation apparatus 200, a user performing the method 450, or the like.

Figure 5:
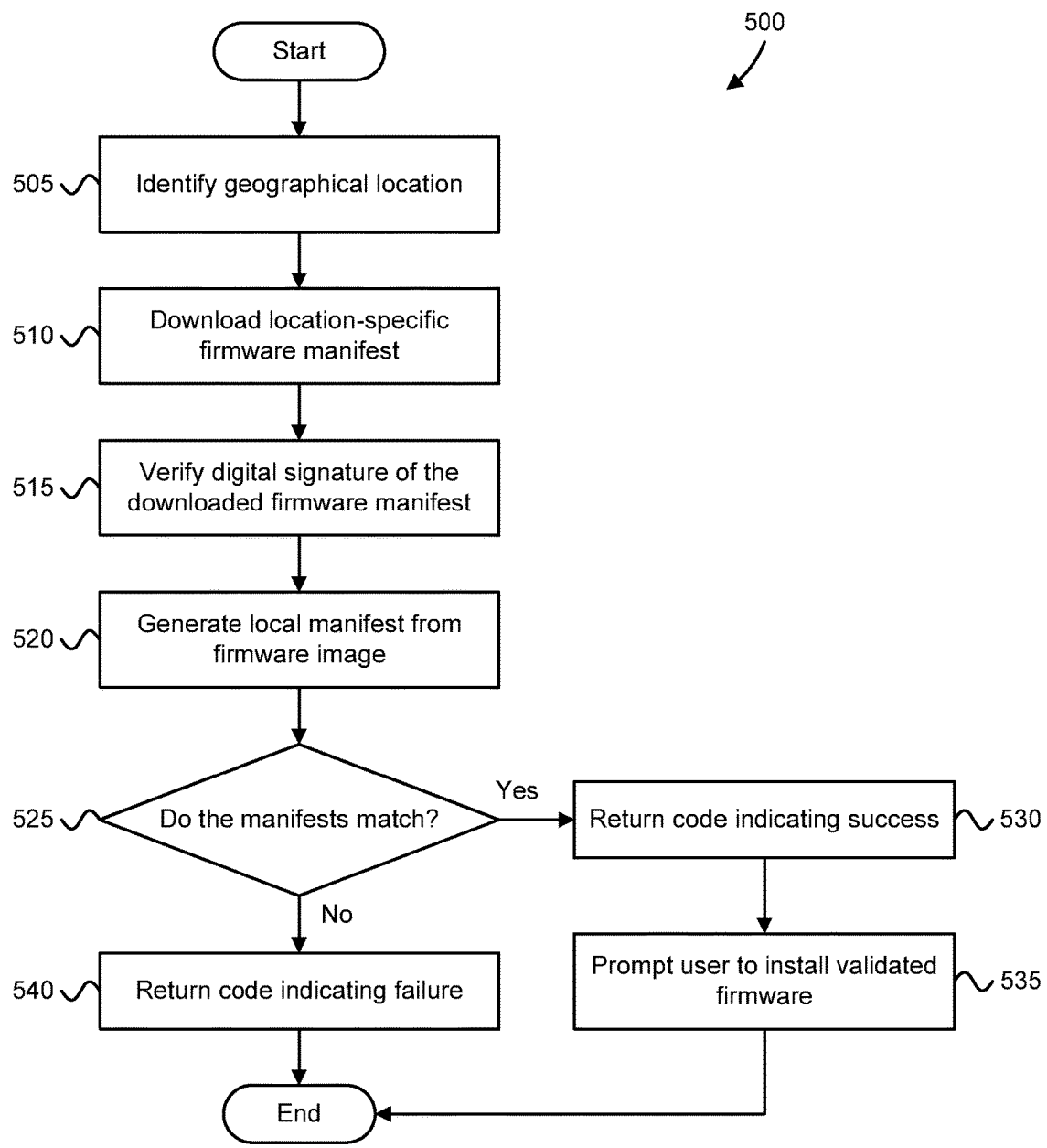
FIG. 5 is a flow chart diagram illustrating one embodiment of a method for validating firmware of a computing device using a location-specific firmware manifest.

FIG. 5 is a schematic flow chart diagram illustrating one embodiment of a method 500 for validating firmware of a computing device. In one embodiment, the method 500 is performed by the electronic device 105. In another embodiment, the method 500 may be performed by the firmware validation apparatus 200. Alternatively, the method 500 may be performed by a computer readable storage medium, such as the memory 115. The computer readable storage medium may store code that is executed on the processor 110 to perform the functions of the method 500.

The method 500 begins and identifies 505 a geographical location of the electronic device 105, the firmware validation apparatus 200, a user performing the method 500, or the like. In one embodiment, identifying 505 the geographic location includes querying a navigation system, such as a satellite navigation system, for the geographic location. In another embodiment, identifying 505 the geographic location includes determining the geographic location based on a network address, such as an IP address, issued to the electronic device 105, the firmware validation apparatus 200, the user performing the method 500, or the like. In yet another embodiment, identifying 505 the geographic location includes propping a user for the geographic location.

The method 500 downloads 510 a location specific firmware manifest based on the geographic location, for example from the firmware provider 130, an author of the firmware image, and/or the trusted third-party. In some embodiments, the firmware manifest may be specific to a nation or country, wherein the nation or country generates the firmware manifest and an entity trusted by the nation or country digitally signs the firmware manifest. Thus a firmware manifest specific to nation or country may be downloaded 510 where the electronic device 105, the firmware validation apparatus 200, the user performing the method 500, or the like, is located within that nation or country. In certain embodiments, downloading 510 the location specific firmware manifest includes downloading a's location specific firmware package which includes both the location specific firmware manifest and a corresponding firmware image.

The method 500 verifies 515 a digital signature of the downloaded firmware manifest, wherein the downloaded firmware manifest includes a digital signature issued by a trusted authority, for example the trusted authority 135. In some embodiments, verifying 515 the digital signature includes contacting a public key infrastructure or certificate authority to authenticate the digital signature.

The method 500 generates 520 a local manifest from the firmware image. In some embodiments, generating the local manifest from the firmware image includes identifying a plurality of logical sections of the firmware image and determining at least one characteristic for each logical section. The determined characteristic may include a location of the logical section within the firmware image, a type of content (e.g., code, data, or empty space) stored with the logical section, the size of the logical section, and checking data (e.g., a checksum) for validating the contents stored in logical section.

The method 500 determines 525 whether the local manifest matches the location specific firmware manifest. In some embodiments, determining 525 whether the manifest match includes comparing values in the local manifest corresponding values in the location specific firmware manifest. For example, determining 525 whether the manifests match may include comparing, for each of the plurality of logical sections, a local manifest characteristic to a location specific firmware manifest characteristic.

In response to determining 525 that the manifests match, the method 500 returns 530 the code indicating successful validation of the firmware image and may optionally prompt 535 a user to install the validated firmware image. Otherwise, in response to determining 525 that the manifests do not match, the method 500 returns 540 one or more codes indicating failure of the validation. In some embodiments, the failure codes returned 540 may indicate at least one reason for failure of the firmware validation. The method 500 ends.

Figure 6:
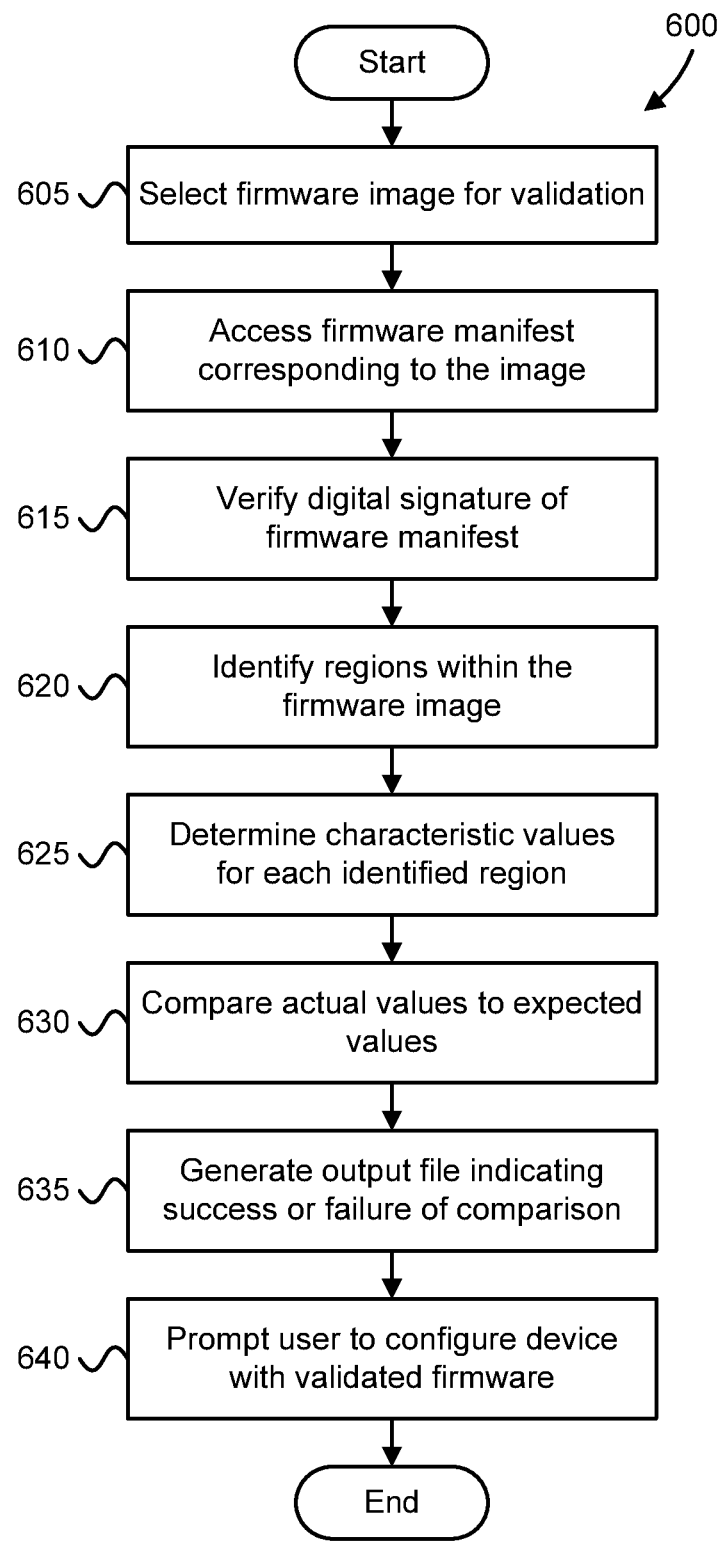
FIG. 6 is a flow chart diagram illustrating another embodiment of a method for validating firmware of a computing device.

FIG. 6 is a schematic flow chart diagram illustrating another embodiment of a method 600 for validating firmware of a computing device. In one embodiment, the method 600 is performed by the electronic device 105. In another embodiment, the method 600 may be performed by the firmware validation apparatus 200. Alternatively, the method 600 may be performed by a computer readable storage medium, such as the memory 115. The computer readable storage medium may store code that is executed on the processor 110 to perform the functions of the method 600.

The method 600 begins and selects 605 a firmware image for validation. In some embodiments, selecting 605 the former image may include selecting a particular firmware image from a plurality of locally stored firmware images, for example stored in the memory 115.

In response to selecting 605 the firmware image, the method 600 accesses 610 firmware manifest corresponding to the selected firmware image. In some embodiments, accessing 610 the firmware manifest includes downloading the firmware manifest, for example from the firmware provider 130, an author of the firmware image, or a trusted third-party. In other embodiments, accessing 610 the firmware manifest may include selecting a firmware manifest stored locally, for example in the memory 115.

The method 600 verifies 615 a digital signature of the firmware manifest, wherein the downloaded firmware manifest includes a digital signature issued by a trusted authority, for example the trusted authority 135. In some embodiments, verifying 515 the digital signature includes contacting a public key infrastructure or certificate authority to authenticate the digital signature.

The method 600 identifies 620 regions within the firmware image. In some embodiments, the firmware image may be logically divided into a plurality of regions. For example, a BIOS firmware image may include a boot block used for firmware recovery, and a post portion. The method 600 determines 625 characteristic values for each identified region. In some embodiments, the characteristic values may indicate a location, a content type, a size, and/or content checking data (e.g., a hash value or checksum) for the identified region. In a further embodiment, content checking data may be ignored where the content type indicates the region stores data, such as configuration data for user variable data.

The method 600 compares 630 actual characteristic values (e.g., the determined characteristic values) to expected characteristic values indicated in the firmware manifest. For example, comparing 630 the actual values to the expected values may include, for each identified region, comparing one or more determined characteristic values to a corresponding number of expected characteristic values included in the firmware manifest.

The manifest 600 generates 635 an output file indicating a success or failure of the comparison. In some embodiments, generating 635 the output file may include creating a log file containing a return code for each comparison of an actual value to an expected value, the return code indicating a success or a failure of the comparison. In a further embodiment, a failure return code includes one or more reasons for the failure.

In response to successfully validating the firmware image, the method 600 may prompt 640 a user to configure the electronic device 105 with the validated firmware image. The method 600 ends. In some embodiments, the pop-up window or other user interface may prompt 640 the user to install the validated firmware image. In other embodiments, the user may be prompted 640 automatically install a successfully validated firmware image is a part of the setup process of a firmware validation tool, such as the firmware validator 120 and/or the firmware validation apparatus 200.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
acquire, from a remote server, a firmware manifest for locally stored firmware,
wherein locally stored firmware comprises a plurality of logical sections, the firmware manifest indicating expected properties for each logical section of the locally stored firmware and expected content for each logical section of the locally stored firmware,
wherein the expected properties for each logical section of the locally stored firmware include: a location of the logical section, a type of content within the logical section, a size of the logical section, and checking data for the logical section,
wherein the type of content within the logical section indicates whether the logical section is one of: a code region, an empty region, and a data region, wherein the plurality of logical sections comprises at least one code region and at least one data region;
authenticate, prior to installation of the locally stored firmware, a digital signature of the firmware manifest, the firmware manifest being signed by a geography-specific key; and
validate, prior to installation of the locally stored firmware, contents of the locally stored firmware using the firmware manifest, wherein validating the contents of the locally stored firmware comprises confirming the location and size of the at least one data region and ignoring the checking data of the at least one data region, and wherein validating the contents of the locally stored firmware comprises confirming the checking data of the at least one code region.

2. The apparatus of claim 1, wherein the processor further identifies a geographical location of the apparatus, wherein acquiring the firmware manifest comprises downloading a location-specific firmware manifest corresponding to the identified geographical location, wherein the geography-specific key corresponds to the geographical location of the apparatus.

3. The apparatus of claim 1, wherein the processor further selects the locally stored firmware from a plurality of locally stored firmware residing on a local storage device.

4. The apparatus of claim 1, wherein validating the contents of the locally stored firmware comprises:
determining, from the locally stored firmware, properties of the locally stored firmware corresponding to the expected properties in the firmware manifest; and
comparing the determined properties to the expected properties, wherein the determined properties include: a location, a type, a size, and checking data.

5. The apparatus of claim 4, wherein the contents of the locally stored firmware include a plurality of regions, each region having one or more of: a location, a type, a size, and checking data.

6. The apparatus of claim 4, wherein the processor further generates an output file including details of the comparison.

7. The apparatus of claim 1, wherein the locally stored firmware comprises a basic input/output system (BIOS) firmware.

8. A method comprising:
acquiring from a server, by use of a processor, a firmware manifest for a locally stored firmware image,
wherein locally stored firmware comprises a plurality of logical sections, the firmware manifest indicating expected properties for each logical section of the locally stored firmware and expected content for each logical section of the locally stored firmware, the firmware manifest including a digital signature,
wherein the expected properties for each logical section of the locally stored firmware include: a location of the logical section, a type of content within the logical section, a size of the logical section, and checking data for the logical section,
wherein the type of content within the logical section indicates whether the logical section is one of: a code region, an empty region, and a data region, wherein the plurality of logical sections comprises at least one code region and at least one data region;
verifying, at a local device, the digital signature of the firmware manifest using a geography specific key; and validating, at the local device, contents of the locally stored firmware image based on the firmware manifest wherein validating the contents of the locally stored firmware image comprises confirming the location and size of the at least one data region and ignoring the checking data of the at least one data region, and wherein validating the contents of the locally stored firmware comprises confirming the checking data of the at least one code region.

9. The method of claim 8, further comprising:
generating a local firmware manifest from the firmware image, wherein validating the contents of the firmware image comprises comparing the local firmware manifest to the firmware manifest; and
indicating, to a user, one of success and failure of the firmware validation based on the comparison.

10. The method of claim 9, wherein generating a local firmware manifest from the firmware image comprises:
identifying the plurality of logical sections of the firmware; and
determining a characteristic for each logical section, the characteristic selected from the group consisting of: a type of data stored in the logical section, a size of the logical section, and checking data for the logical section,
wherein comparing the local firmware manifest to the firmware manifest comprises comparing, for each of the plurality of logical sections, a local firmware manifest characteristic to a firmware manifest characteristic.

11. The method of claim 9, further comprising outputting a return code, in response to failure of the firmware validation, the return code indicating at least one reason for failure of the firmware validation.

12. The method of claim 8, further comprising identifying a geographical location of the local device, wherein accessing the firmware manifest comprises downloading a location-specific firmware manifest corresponding to the identified geographical location, wherein the geography-specific key corresponds to the geographical location of the local device.

13. The method of claim 8, further comprising downloading the firmware manifest from one of an author of the firmware image and a trusted third party.

14. The method of claim 8, further comprising prompting a user to configure a computing device using the validated firmware.

15. The method of claim 8, wherein the firmware comprises a plurality of independent sections of code and wherein the firmware manifest includes a sub-firmware manifest for each independent section of code in the firmware.

16. The method of claim 8, wherein validating contents of the firmware using the firmware manifest comprises comparing, prior to installation of the firmware, portions of the firmware to expected values indicated by the firmware manifest.

17. The method of claim 8, wherein accessing the firmware manifest comprises downloading a location-specific firmware package, the firmware package containing both the firmware image and the firmware manifest.

18. A program product comprising a computer readable storage medium that is not a transitory signal and that stores code executable by a processor, the executable code comprising code to perform:
acquiring, from a server, a firmware manifest for locally stored firmware,
wherein locally stored firmware comprises a plurality of logical sections, the firmware manifest indicating expected properties for each logical section of the locally stored firmware and expected content for each logical section of the locally stored firmware,
wherein the expected properties for each logical section of the locally stored firmware include: a location of the logical section, a type of content within the logical section, a size of the logical section, and checking data for the logical section,
wherein the type of content within the logical section indicates whether the logical section is one of: a code region, an empty region, and a data region, wherein the plurality of logical sections comprises at least one code region and at least one data region;
authenticating, prior to installation of the locally stored firmware, the digital signature of the firmware manifest, the firmware manifest being signed by a geography-specific key; and
validating, prior to installation of the locally stored firmware, contents of the locally stored firmware using the firmware manifest, wherein validating the contents of the locally stored firmware comprises confirming the location and size of the at least one data region and ignoring the checking data of the at least one data region, and wherein validating the contents of the locally stored firmware comprises confirming the checking data of the at least one code region.

19. The program product of claim 18, the code to further perform:
creating a locally generated firmware manifest from the locally stored firmware, wherein validating contents of the locally stored firmware using the firmware manifest comprises comparing the locally generated firmware manifest to the firmware manifest.

20. The program product of claim 18, further comprising prompting a user to install the locally stored firmware in response to successfully validating the locally stored firmware, wherein validating the locally stored firmware comprises examining the locally stored firmware in an uninstalled state.

* * * * *